No. 770,328. PATENTED SEPT. 20, 1904.
G. SMITH.
DISK HARROW.
APPLICATION FILED DEC. 14, 1903.
NO MODEL. 2 SHEETS—SHEET 1.
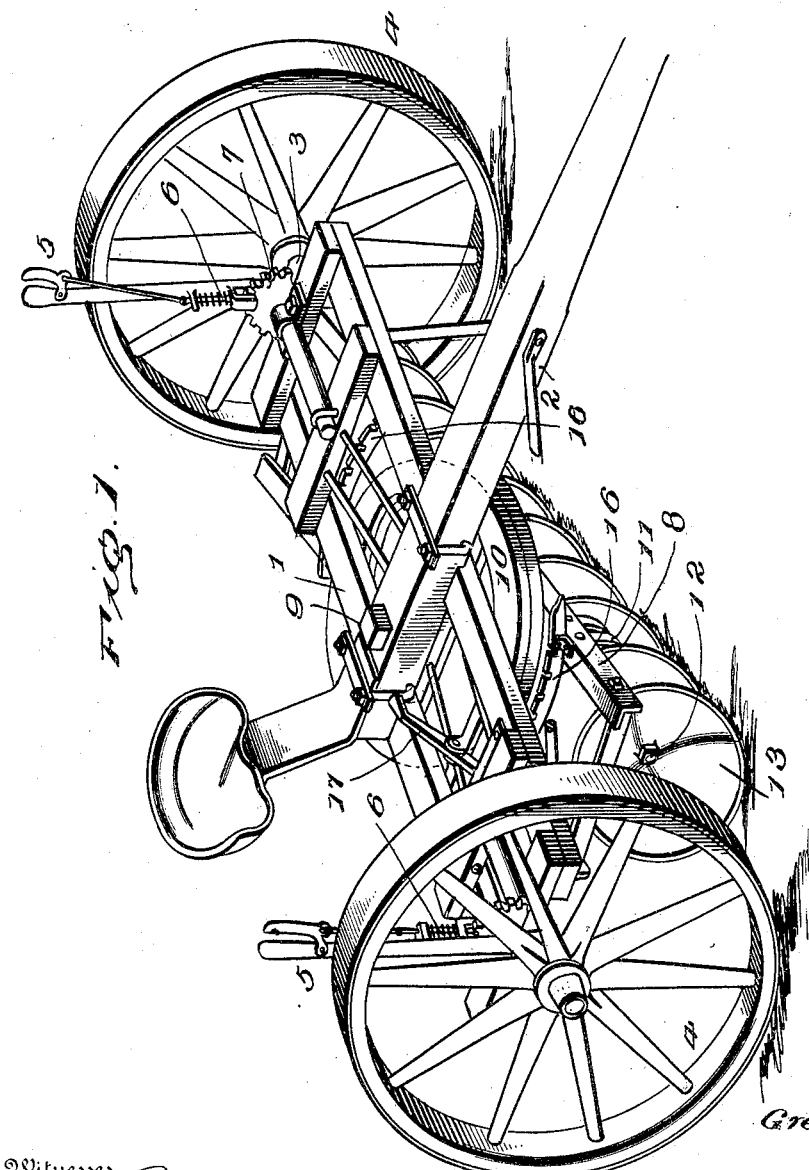
Inventor
Greene Smith
Witnesses
By
R.S.&A.B.Lacey, Attorneys

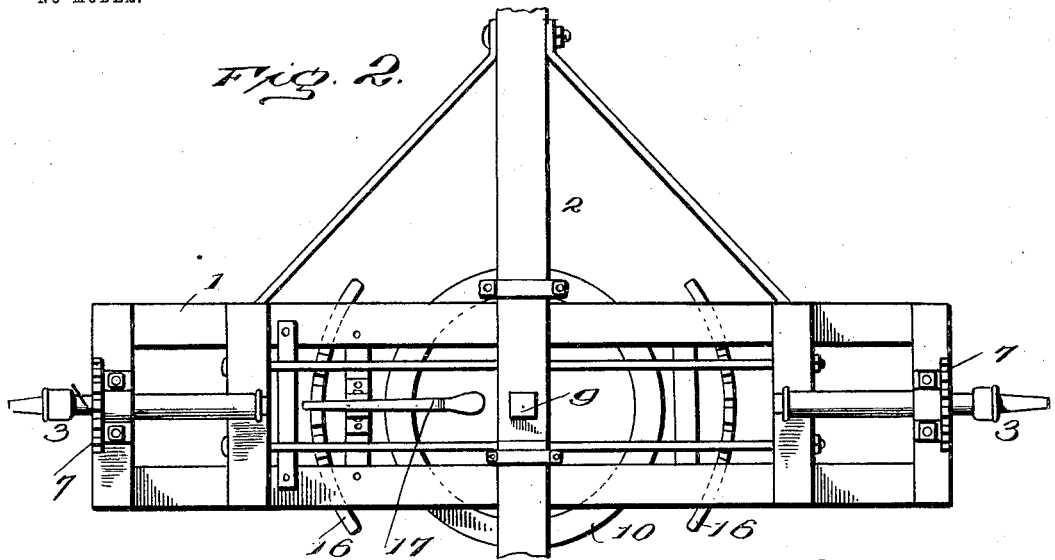
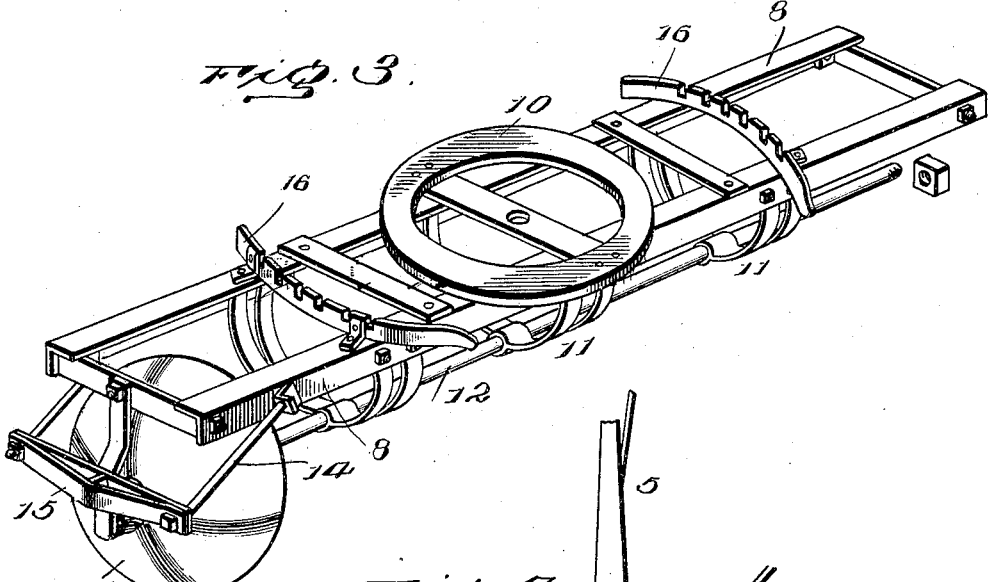
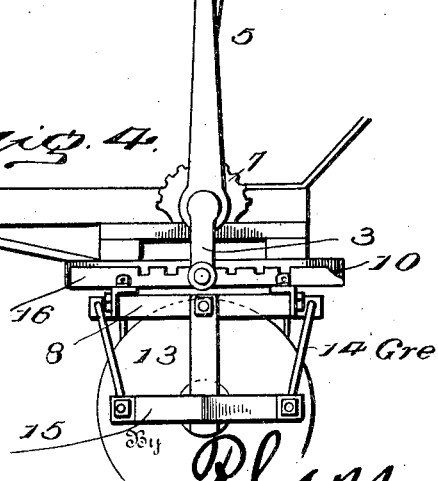

No. 770,328.

Patented September 20, 1904.

UNITED STATES PATENT OFFICE.

GREENE SMITH, OF COLFAX, WASHINGTON.

DISK HARROW.

SPECIFICATION forming part of Letters Patent No. 770,328, dated September 20, 1904.

Application filed December 14, 1903. Serial No. 185,096. (No model.)

*To all whom it may concern:*

Be it known that I, GREENE SMITH, a citizen of the United States, residing at Colfax, in the county of Whitman and State of Washington, have invented certain new and useful Improvements in Disk Harrows, of which the following is a specification.

This invention relates to an improved form of harrow, the vital feature of the invention residing in the particular manner of mounting the cutters upon the frame of the implement, whereby the said cutters are adapted to be reversed, making it possible to operate on a hillside, so as to throw the soil downhill, as with a sidehill-plow.

A further advantage derived from the structure of the harrow as embodied in the invention is that same may be used to cultivate any part of a field by simply going to and fro along a hillside.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a harrow embodying the invention. Fig. 2 is a top plan view, ground-wheels removed. Fig. 3 is a detail perspective view of the cutter-frame. Fig. 4 is a section view through the implement.

Corresponding and like parts are referred to in the following description and indicated in all the views of the drawings by the same reference characters.

The implement consists of a supporting-frame 1, from which extends a tongue 2, to which the draft-animals are secured in the usual manner. Mounted in suitable bearings upon the end portions of the frame 1 are stub crank-axles 3, upon which the ground-wheels 4 are mounted, said stub-axles 3 being adapted for adjustment, so as to raise or lower the frame 1 relative to the ground-wheels, and thereby regulate the depth of a cultivation of the soil. Operating-levers 5, carried by the stub-axles, constitute the means for adjusting the said axles, the position of the operating-levers 5 being fixed by suitable latch means 6, coöperating with toothed segments 7 in a manner which will be readily apparent. A cutter-frame 8 is disposed beneath the supporting-frame 1, being secured to the supporting-frame by means of a king-bolt 9. A fifth-wheel 10 of any ordinary type is located between the supporting-frame 1 and the cutter-frame 8 to readily admit of the pivotal movement of the cutter-frame relative to the supporting-frame. Brackets 11 are secured to the cutter-frame 8, depending therefrom, and said brackets are utilized to support the cutter-shaft 12, which shaft carries the gang of disks 13. The disks 13 have their concave sides arranged in the same direction, and the disks may be mounted upon the shaft by any desirable means found best in the practical embodiment of the invention. To reinforce the bearings of the main or cutter shaft 12 and support same against the end thrust of the cutting devices 13 as the implement is advanced, brace-bars 14 connect an end bearing-bar 15, said brace-bars effecting the desired result in a manner which will be obvious.

As will be noted from the foregoing, the cutter-frame is mounted for a pivotal or a rotary movement relative to the supporting-frame, and in order to fix the position of the cutter-frame at a desired adjustment, either angularly or otherwise, rack-bars 16 are secured to the upper side of the cutter-frame 8, and these rack-bars are adapted to be engaged by the lower end of a lever 17, pivoted to the supporting-frame and provided at its upper end with an operating-handle disposed convenient to the operator of the implement seated upon the seat 18, secured to the supporting-frame 1.

In the operation of the implement in reversing the direction of advance of the same the lever 17 is operated so as to be disengaged from the rack-bar 16 and the team is driven around preparatory to proceeding in the opposite direction. The lever 17 is of course engaged with the rack-bars 16 upon the opposite side of the cutter-frame 8, so as to lock the said frame at the desired adjustment as soon as the position of the supporting-frame relative to the cutter-frame has been reversed. The depth of cultivation will be regulated, as before premised, by operation of the levers 5.

Having thus described the invention, what is claimed as new is—

In an implement of the class described, the combination with a supporting-frame, supporting-wheels mounted upon said frame, a cutter-frame disposed beneath the supporting-frame and pivotally connected with the said supporting-frame, a fifth-wheel connection between the cutter-frame and the supporting-frame, a cutter-shaft mounted upon the cutter-frame, cutting-disks mounted upon the cutting-shaft, a bar pendent from one end of the cutter-frame and provided with a bearing to receive one end of the cutter-shaft, brace-bars connecting the cutter-frame with the end portion of the bearing-bar above mentioned, said bearing-bar being adapted to receive the end thrust of the cutting-shaft, arcuate rack-bars secured to the upper side of the cutter-frame adjacent the end portions thereof, and a lever pivoted to the supporting-frame and provided at one end with a handle and having the other end adapted to engage either of the arcuate rack-bars of the cutter-frame.

In testimony whereof I affix my signature in presence of two witnesses.

GREENE SMITH. [L. S.]

Witnesses:
R. H. LACEY,
O. L. KENNEDY.